Patented Nov. 9, 1926.

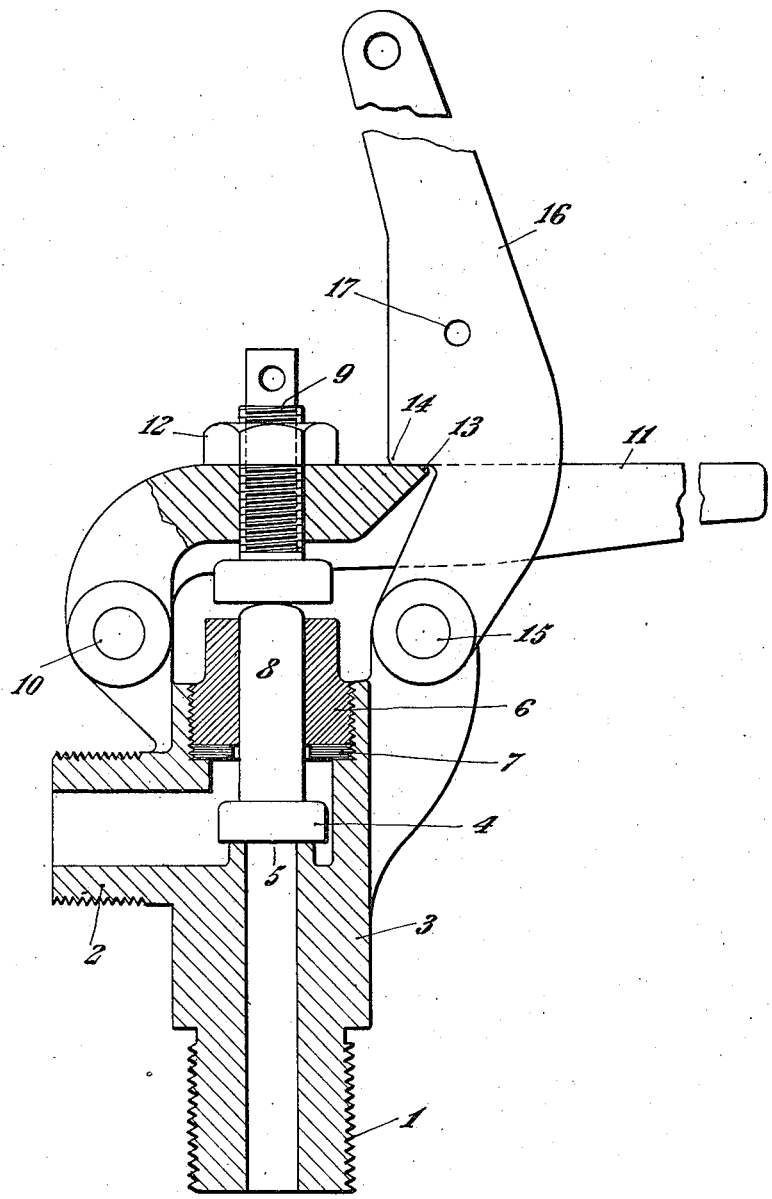

1,606,191

UNITED STATES PATENT OFFICE.

DANIEL SIEBENMANN, OF BERN, SWITZERLAND.

QUICK-ACTING VALVE, PARTICULARLY ADAPTED FOR LIQUEFIED GASES.

Application filed March 29, 1926. Serial No. 98,122, and in Switzerland March 31, 1925.

This invention has for its object a novel quick acting valve particularly adapted for liquefied gases, and I have herein shown my invention in such relation.

My invention relates to a quick acting valve, particularly adapted for liquefied gases, for instance anhydrous carbonic acid for extinguishing purposes, at generators which have caught fire.

I have devised means whereby the valve for such extinguishing purposes will act very quickly, a decidedly valuable feature, and I have arranged the parts to be operated so that by simply moving a lever the whole passage for discharge will suddenly be free.

The novel feature of my invention will be fully described in the following specification and particularly pointed out in the claims.

The figure is a vertical section of the quick acting valve. The valve chest 3 has a threaded part 1 adapted to be screwed to the top of a gas bottle, and the threaded part 2 is adapted to be connected to a conduit pipe or tube. The valve chest which has an opening 5 for discharge of gas normally closed by the valve disk 4, also has a hollow threaded plug 6, an overlapping packing ring 7 being interposed between same and the seat of the valve chest. The valve disk 4 has a vertical spindle 8, which extends through the packing ring 7 and the plug 6, and is controlled by a set screw 9 in a lever 11 pivoted at 10 to the valve chest. The set screw 9 is secured by a nut 12 and must be so adjusted, that the valve disk 4 will be well pressed upon its seat, when the nose 13 of lever 11 engages a shoulder 14 of the blocking lever 16 pivotally mounted at 15 on the valve chest. The blocking lever 16 is preferably provided at its free end with means for pulling it, so that in a case of fire the blocking lever may be quickly moved to free lever 11. The latter is then instantaneously set free, and as a consequence of the high pressure under the valve disk 4, the same is suddenly raised from its seat and pressed against the packing ring 7 thus avoiding any losses of gas at this point. The pin 17 fixed in the blocking lever 16 hinders the lever 11 from being thrown over to the other side, when the valve disk with the spindle is suddenly pressed upward.

In order to close the valve again the lever 11 is moved downward, whereby the valve disk 4 is pressed upon its seat, and the blocking lever 16 is returned to its blocking position.

The valve described above allows the whole area which is available for the passage of the gas to be suddenly free for discharge at the moment of its opening, so that in a very short time a considerable quantity of gas can pass through the valve, a decidedly valuable feature in fire extinguishing.

Having now fully described my invention, what I claim is:

1. A quick acting valve, particularly adapted for liquefied gases, comprising a valve disk governed by a normally blocked and instantaneously releasing lever, an adjustable member interposed between said valve disk and said lever, and means for suddenly freeing the whole passage for discharge at the moment of release of the said lever and for allowing the opening of the valve disk under the action of the high gas pressure.

2. A quick acting valve, particularly adapted for liquefied gases, comprising a valve chest, a bored plug screwed into said valve chest, a packing ring between said plug and said chest, a movable valve disk having a spindle, said spindle passing through and being guided in the bore of said plug, said disk adapted to be pressed to its seat by means of a set screw in a blocked lever, and adapted to be pressed against the packing ring by the pressure of the controlled gas when said lever is released, thus preventing any loss of gas through the bore of said plug.

3. A quick opening valve, particularly adapted for liquefied gases, having an operating lever, carrying a set screw, a blocking lever attached to the valve chest, said blocking lever being opposite to the operating lever, the blocking lever having a stop pin serving to limit the opening movement of the operating lever.

Signed at Bern, this 16th day of March, 1926.

In testimony whereof I affix my signature.

DANIEL SIEBENMANN.